United States Patent [19]

Tse et al.

[11] Patent Number: 5,708,481

[45] Date of Patent: Jan. 13, 1998

[54] FAST CURRENT-MODE ANALOG CIRCUIT FOR CONVERTING VIDEO DATA SIGNALS BETWEEN COLOR SPACE FORMATS

[75] Inventors: Lawrence Tze-Leung Tse, Fremont; King Cheung Yen, San Jose, both of Calif.

[73] Assignee: Chrontel, Inc., San Mateo, Calif.

[21] Appl. No.: 691,805

[22] Filed: Jul. 31, 1996

[51] Int. Cl.[6] .................................................. H04N 9/67
[52] U.S. Cl. .................................. 348/659; 348/660
[58] Field of Search ............................ 348/659, 660, 348/661; 345/153, 154; 358/518; H04N 9/67

[56] References Cited

U.S. PATENT DOCUMENTS

| | | | |
|---|---|---|---|
| 3,996,609 | 12/1976 | Avery | 348/659 |
| 4,300,154 | 11/1981 | Engel | 348/660 |
| 4,346,400 | 8/1982 | Hovens | 348/659 |

OTHER PUBLICATIONS

Brooktree Corporation, Bt281 27 MHz Programmable Color Space Converter and Color Corrector (1993) Section 3, pp. 3–94 to 3–125.
CCIR International Radio Consultative Committee, Encoding Parameters of Digital Television For Studios, (Geneva, 1990) pp. 95–104.
Philips Semiconductors, Desktop Video Data Handbook (1995) pp. 74–75.
IEEE International Solid–State Circuits Conference, ISSCC96/Session 12/Serial Data Communications/Paper FP 12.1 (1996) pp. 194–195 and 443.
Bang–Sup Song, et al., NRZ Timing Recovery Technique for Band–Limited Channels (Feb. 1996) pp. 1–4 and Figures 1–7.

*Primary Examiner*—Sherrie Hsia
*Attorney, Agent, or Firm*—Flehr Hohbach Test Albritton & Herbert LLP

[57] ABSTRACT

A color space converter is implemented using current mode analog circuitry to efficiently transform video data from a $YC_bC_r$ format to an RGB format in order to allow the display of video signals on a color monitor. The analog current-mode circuitry is implemented in an integrated circuit that will operate at high clock rates and can be integrated in a small die area so as to reduce its cost. The color space converter includes Y, $C_b$ and $C_r$ current-mode conversion circuits to compute Y, $C_b$ and $C_r$ contributions to the G, R and B signals, and current-mode adders that add those contributions to the G, R and B signals to generate the G, R and B signals. Each conversion circuit includes (A) a respective folded cascode structure having an input coupled to a respective analog Y, $C_b$ or $C_r$ signal, each conversion circuit generating a respective Y, $C_b$ or $C_r$ current output; (B) at least one respective current mirror that generates from the Y, $C_b$ or $C_r$ current output an unadjusted Y, $C_b$ or $C_r$ contribution to at least one of the G, R and B signals, and (C) at least one current adder for subtracting respective offset currents from the unadjusted Y, $C_b$ or $C_r$ contribution to at least one of the G, R and B signals to provide the Y, $C_b$ or $C_r$ contribution to at least one of the G, R and B signals.

20 Claims, 8 Drawing Sheets

Current-switched implementation of Y contribution to "G" color signal

Fig. 1. Video display system with window scaling

Fig. 2. Video display pixel rate dependence on window size

Fig. 3. Conventional analog implementation of "Green" (G) color space conversion
PRIOR ART Fig. 4A. Current-switched implementation of Y contribution to "G" color signal Fig. 4B. Generalized low-impedance current input structure Fig. 5. Current-switched implementation of Cb contribution to "G" color signal Fig. 6. Current-switched implementation of Cr contribution to "G" color signal Fig. 7B Current-mode adder for "R" color signal Fig. 7A Current-mode adder for "B" color signal

FAST CURRENT-MODE ANALOG CIRCUIT FOR CONVERTING VIDEO DATA SIGNALS BETWEEN COLOR SPACE FORMATS

The present invention relates generally to video processing circuitry and methods for converting video signals between color space formats. While the description below refers specifically to a color space converter that converts video data from the $YC_bC_r$ (luminance and color-difference) format to the RGB (primary color) format, the same techniques can be applied to allow video data to be converted between any color space formats.

BACKGROUND OF THE INVENTION

Digital video is a key feature of multimedia systems. Digital video signals are typically encoded in the $YC_bC_r$ format, where Y is the "luminance" signal, while $C_b$ and $C_r$ are "color-difference" signals that carry the chrominance information. However, color monitors such as those used as the display terminals for personal computers, are usually driven by signals encoded in an RGB (Red, Green, Blue) format. Therefore, a transformation from the $YC_bC_r$ format to the RGB format is required in order to display a $YC_bC_r$-encoded video signal on a color monitor. The circuitry for performing this transformation is typically called a Color Space Converter. Similar color space conversion is required in order to display graphical data typically encoded in the RGB format to the $YC_bC_r$ format used for television signals.

Figure 1:
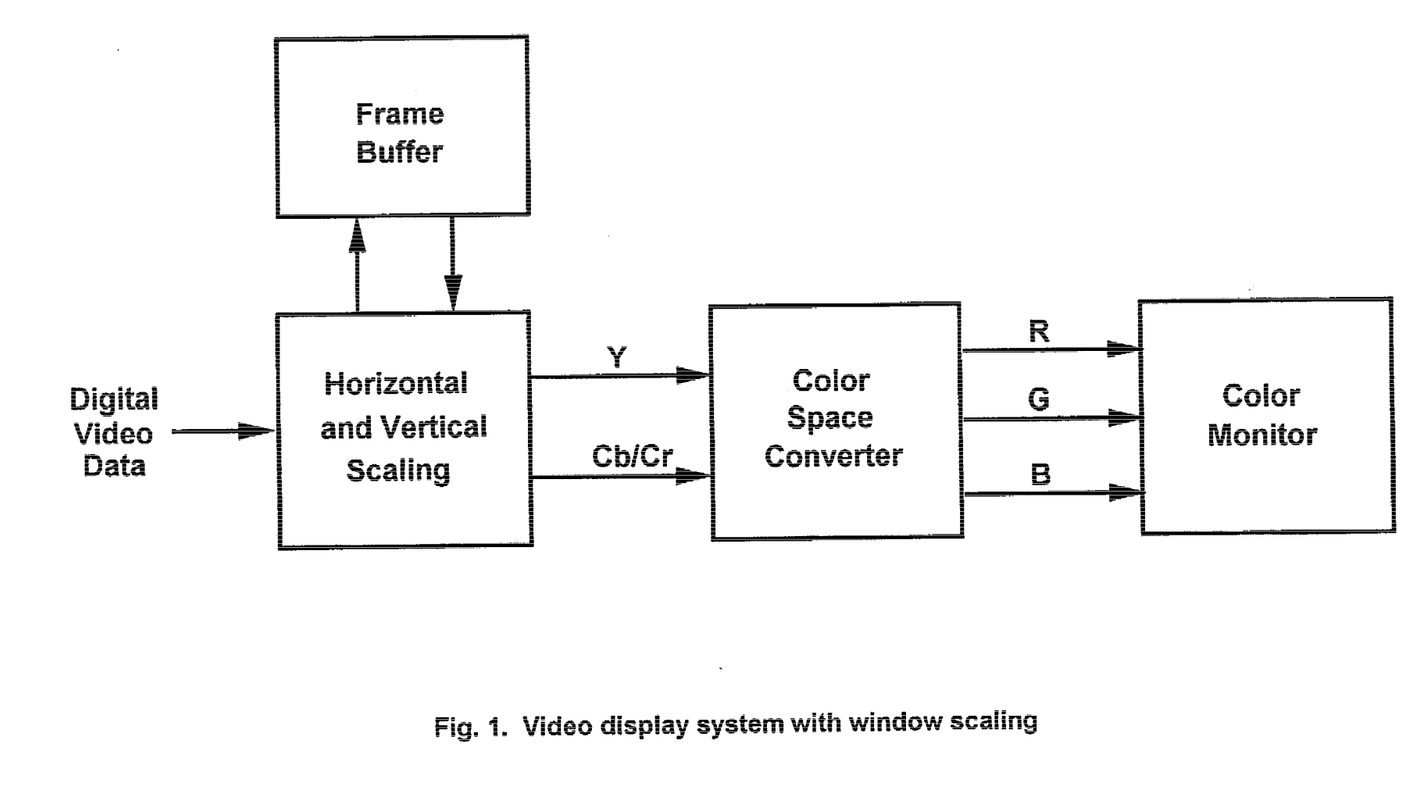
FIG. 1 is a block diagram of a video display system with window scaling and color space conversion.
Figure 2:
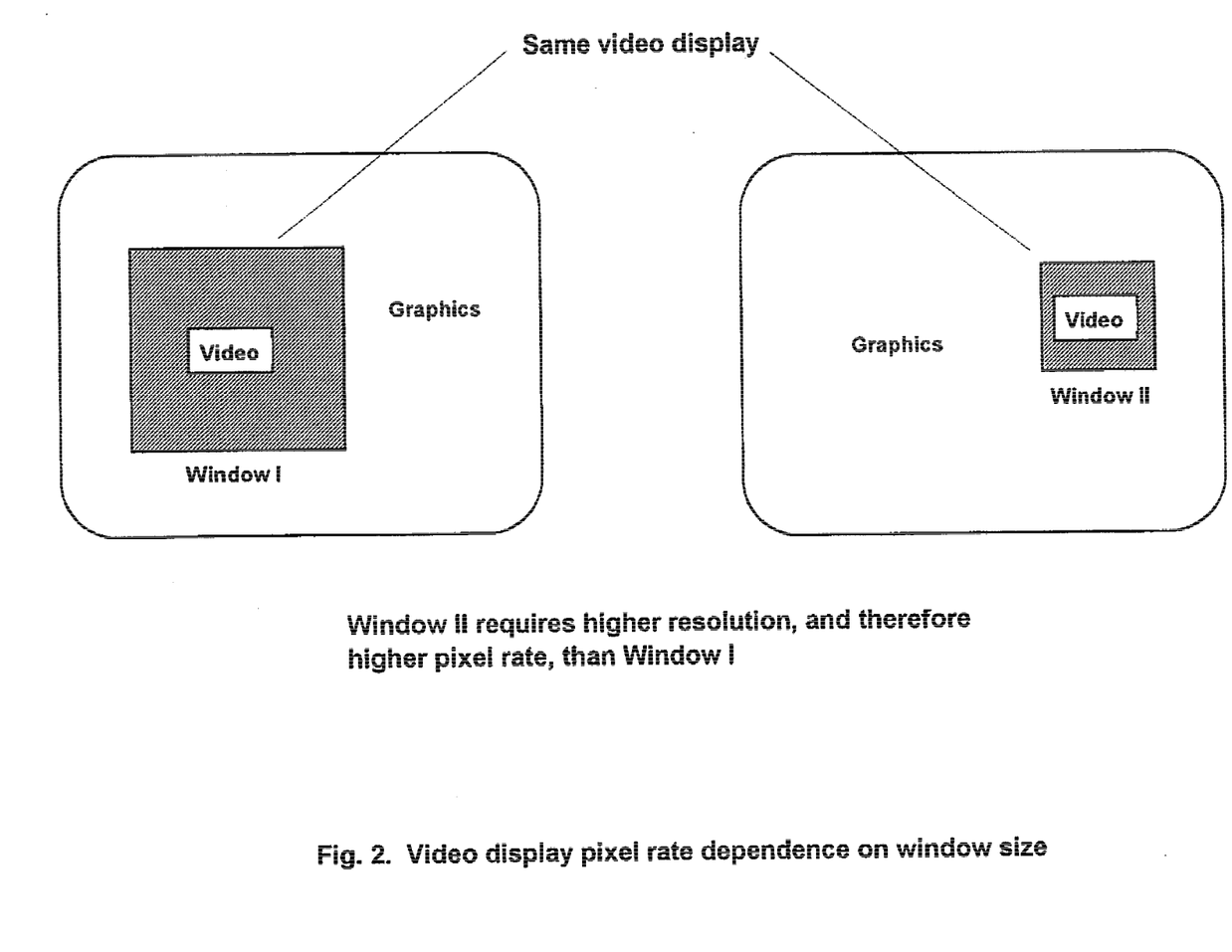
FIG. 2 depicts the rescaling of a video window.

The CCIR 601-2 standard for digitizing television signals specifies a sampling rate of 13.5 MHz for the luminance signal, and this rate is often used as the video display pixel rate in applications such as Video/Graphics overlays. However, in order to be able to display a video picture in windows of different sizes, scaling of the video data is required, as depicted in the block diagram of FIG. 1. As illustrated in FIG. 2, in order to display a video frame in a smaller window without losing picture information, the resolution within that window, and thus the pixel rate, must be increased. Pixel rates as high as 80 MHz are expected in future systems capable of displaying video signals on a color monitor. Hence, color space converters for performing the $YC_bC_r$-to-RGB translation should support pixel rates of at least 80 MHz.

The relationship between $YC_bC_r$ and RGB signals can be specified by the following matrix of equations:

$$R = 1.164(Y - 16) + 1.596(C_r - 128)$$
$$G = 1.164(Y - 16) - 0.813(C_r - 128) - 0.391(C_b - 128)$$
$$B = 1.164(Y - 16) + 2.018(C_b - 128)$$

The $YC_bC_r$ to RGB conversion is compliant with CCIR Recommendation 601-1, Reports of the International Radio Consultative Committee, International Telecommunications Union. Additionally, in CCIR 601-2, Y ranges from 16 to 235. Hence, the factor 1.164 is used to scale the Y signal back to full scale (i.e., $[235-16+1] \times 1.164 = 256$).

Note that the $YC_bC_r$ color space is sometimes loosely referred to as the YUV color space. In actuality, YUV (which we will hereinafter refer to as Y'UV) is an intermediate step in the formation of composite NTSC/PAL color television signals. The Y', U and V signals are respectively related to Y, $C_b$ and $C_r$ signals as follows:

$$Y' = 1.164(Y - 16)$$
$$U = C_b - 128$$
$$V = 1.4(C_r - 128)$$

A color space converter could be designed to process video signals in either digital or analog form. From the matrix above, it is apparent that multiplications are needed to implement the conversion. However, because only fixed-coefficient multiplications are required, it is not necessary to use a general purpose multiplier. Instead, multiplication can be realized as a series of additions.

In a digital implementation, fixed-coefficient multiplication can be simplified into a sequence of additions. However, simple ripple-carry adders are not, at present, capable of supporting the high pixel rates required. Therefore, higher performance circuits, such as carry look-ahead or carry-save adders must be used to achieve the required throughput. Unfortunately, these circuits add significant complexity to the design of a color space converter. In an integrated circuit implementation, larger and more complex adder circuits translate into larger die area, and hence higher cost.

Figure 3:
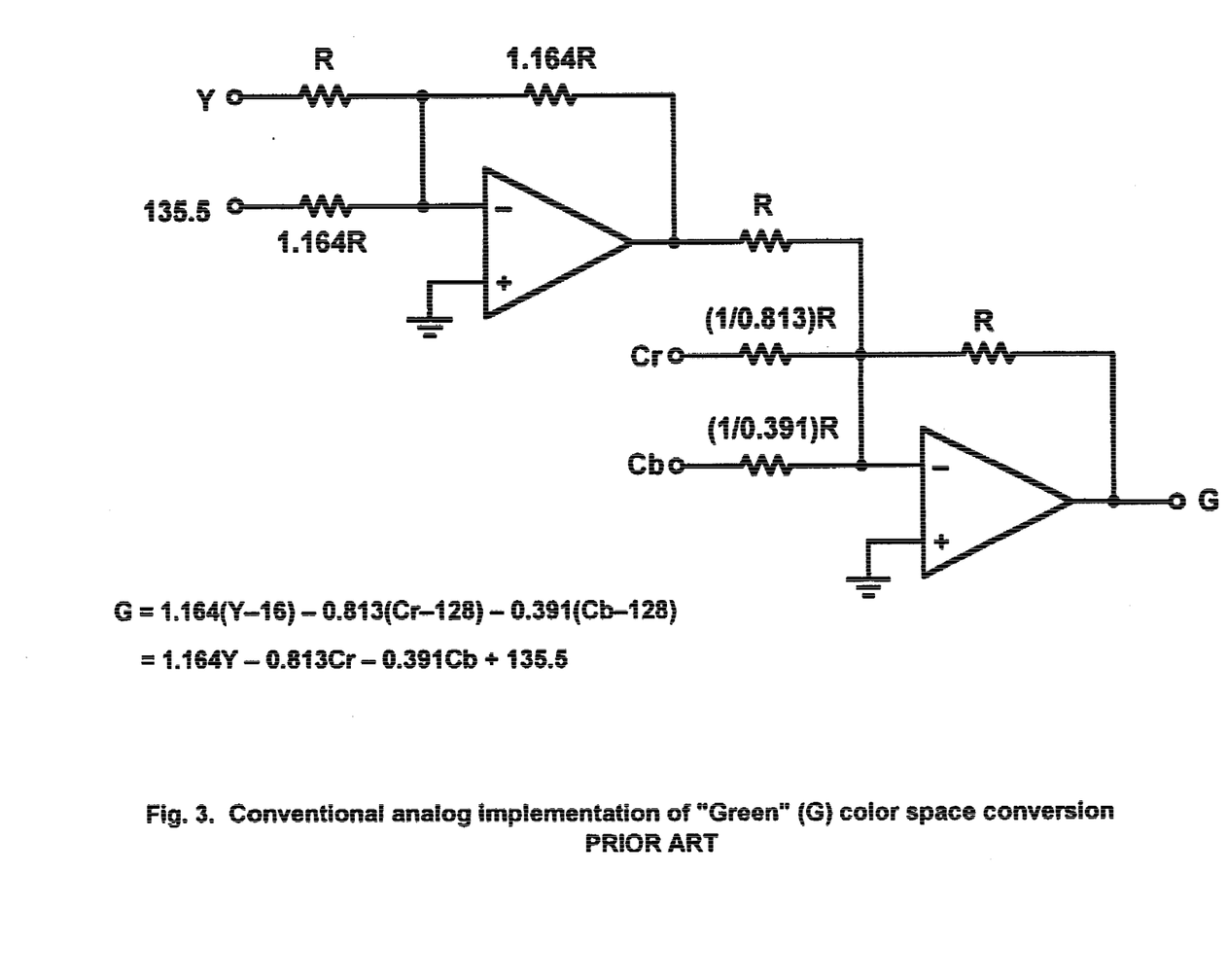
FIG. 3 depicts a conventional analog implementation of the color space conversion of $YC_bC_r$ signals into a green (G) color signal.

Traditional analog implementations of color space converters use operational amplifiers to implement the conversion matrix. One such implementation is illustrated in FIG. 3. However, pixel display rates as high as 80 MHz with such an implementation would require operational amplifiers with bandwidths in the GHz range. Such amplifiers are not practical since they cannot be implemented without significant penalties in power consumption and silicon real estate using conventional CMOS integrated circuit technologies.

It is therefore an object of the present invention to provide a color space converter using analog circuitry that avoids the use of operational amplifiers and that is significantly lower in cost to implement than a comparable color space converter using digital circuitry.

SUMMARY OF THE INVENTION

In summary, the present invention is a color space converter that employs current-mode, analog circuitry to convert $YC_bC_r$ signals to RGB signals at pixel rates of at least 80 MHz. The present color space converter does not employ operational amplifiers and can be implemented at a lower cost than a color space converter using digital circuitry. More particularly, the present invention is a current-mode color space converter that includes Y, $C_b$ and $C_r$ conversion circuits that are respectively configured to convert Y, $C_b$ and $C_r$ signals to R, G and B signals.

The Y conversion circuit includes a first low impedance current input structure and a first current mirror. The first low impedance current input structure has an input coupled to an analog Y signal and provides a Y current output. The first current mirror generates from the Y current output the Y contributions to the G, R and B signals.

The $C_b$ conversion circuit includes a second low impedance current input structure, a second current divider, a second current mirror and a second current adder. The second low impedance current input structure has an input coupled to an analog $C_b$ signal and provides a $C_b$ current output. The second current divider provides first and second divided $C_b$ currents representing specific respective fractions of the $C_b$ current output. The second current mirror generates from the first divided $C_b$ current the $C_b$ contribution to the B signal. The second current adder subtracts from the second divided $C_b$ current a second difference current to provide the $C_b$ contribution to the G signal.

The $C_r$ conversion circuit includes a third low impedance current input structure, a third current divider, a third current mirror and a third current adder. The third low impedance current input structure has an input coupled to an analog $C_r$ signal and provides a $C_r$ current output. The third current divider provides first and second divided $C_r$ currents representing specific respective fractions of the $C_r$ current output. The third current mirror generates from the first divided $C_r$ current the $C_r$ contribution to the R signal. The third current adder subtracts from the second divided $C_r$ current a third difference current to provide the $C_r$ contribution to the G signal.

The color space converter can also include a digital to analog converter (DAC) for converting digitized $YC_bC_r$ signals to the analog $YC_bC_r$ signals and a plurality of current-mode adders that respectively add the Y, $C_b$ and $C_r$ contributions as required to generate the G, R and B signals.

The DAC, the current mode adders and the Y, $C_b$ and $C_r$ converter circuits can be integrated on a single integrated circuit.

The present invention can also be used to convert RGB signals to $YC_bC_r$ signals by simply modifying the current mirror ratios and the current adder differences as required to implement the RGB to $YC_bC_r$ conversion equations.

BRIEF DESCRIPTION OF THE DRAWINGS

Additional objects and features of the invention will be more readily apparent from the following detailed description and appended claims when taken in conjunction with the drawings, in which:

DESCRIPTION OF THE PREFERRED EMBODIMENT

Figure 4A:
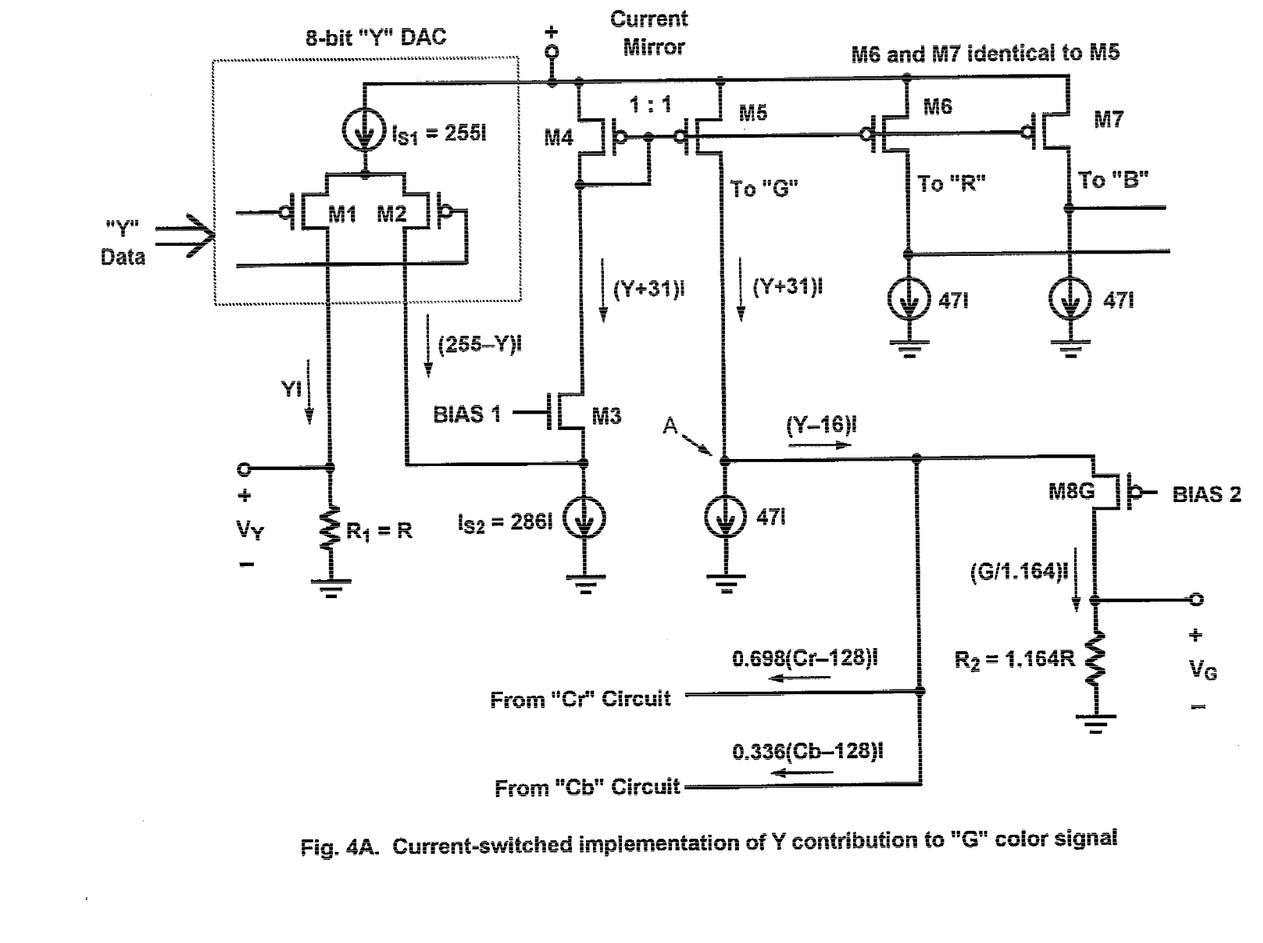
FIG. 4A is a circuit diagram of an analog, current-mode color space conversion circuit for converting Y data signals into a portion of a green (G) color signal.
Figure 5:
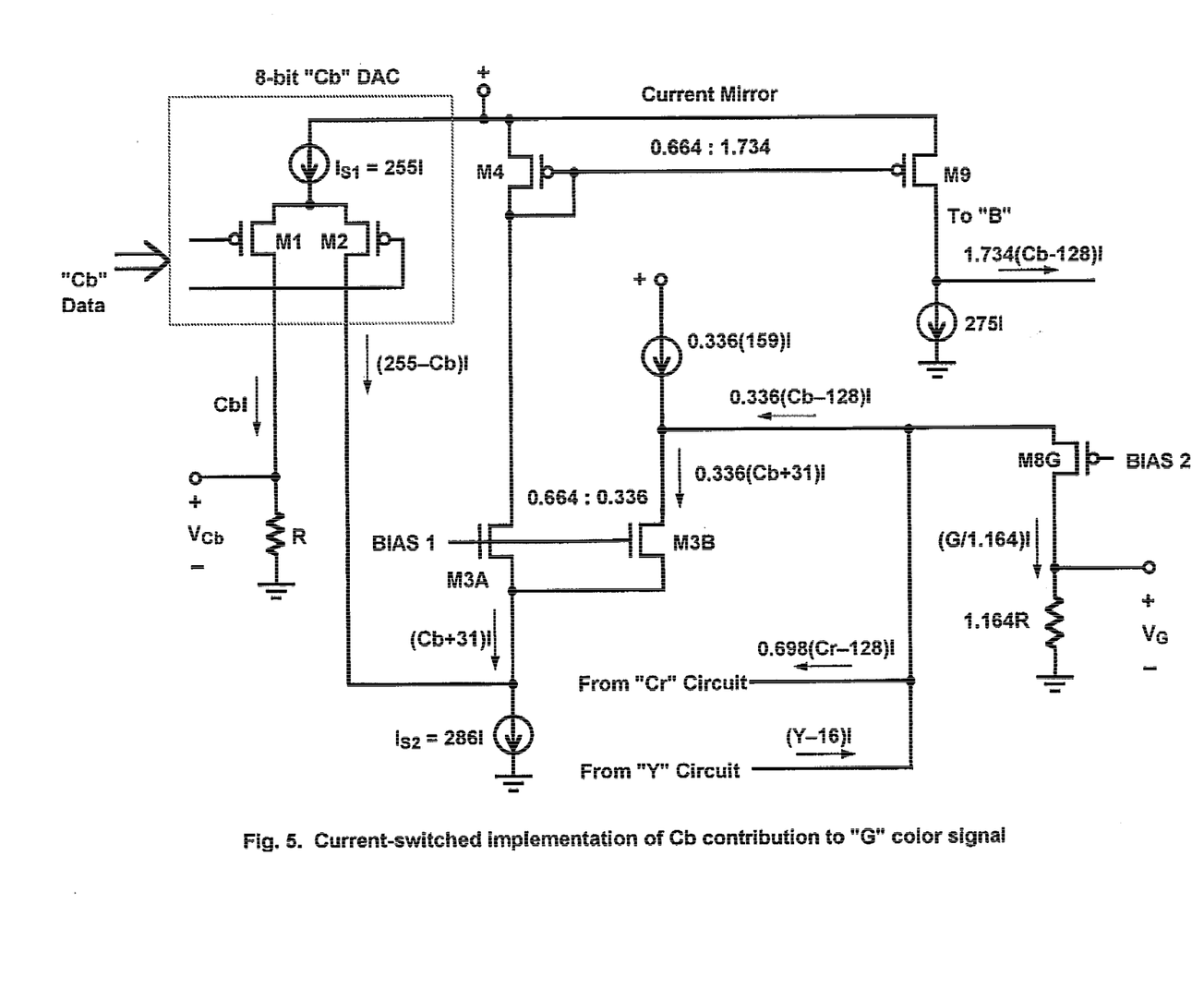
FIG. 5 is a circuit diagram of an analog, current-mode color space conversion circuit for converting $C_b$ data signals into a portion of a green (G) color signal.
Figure 6:
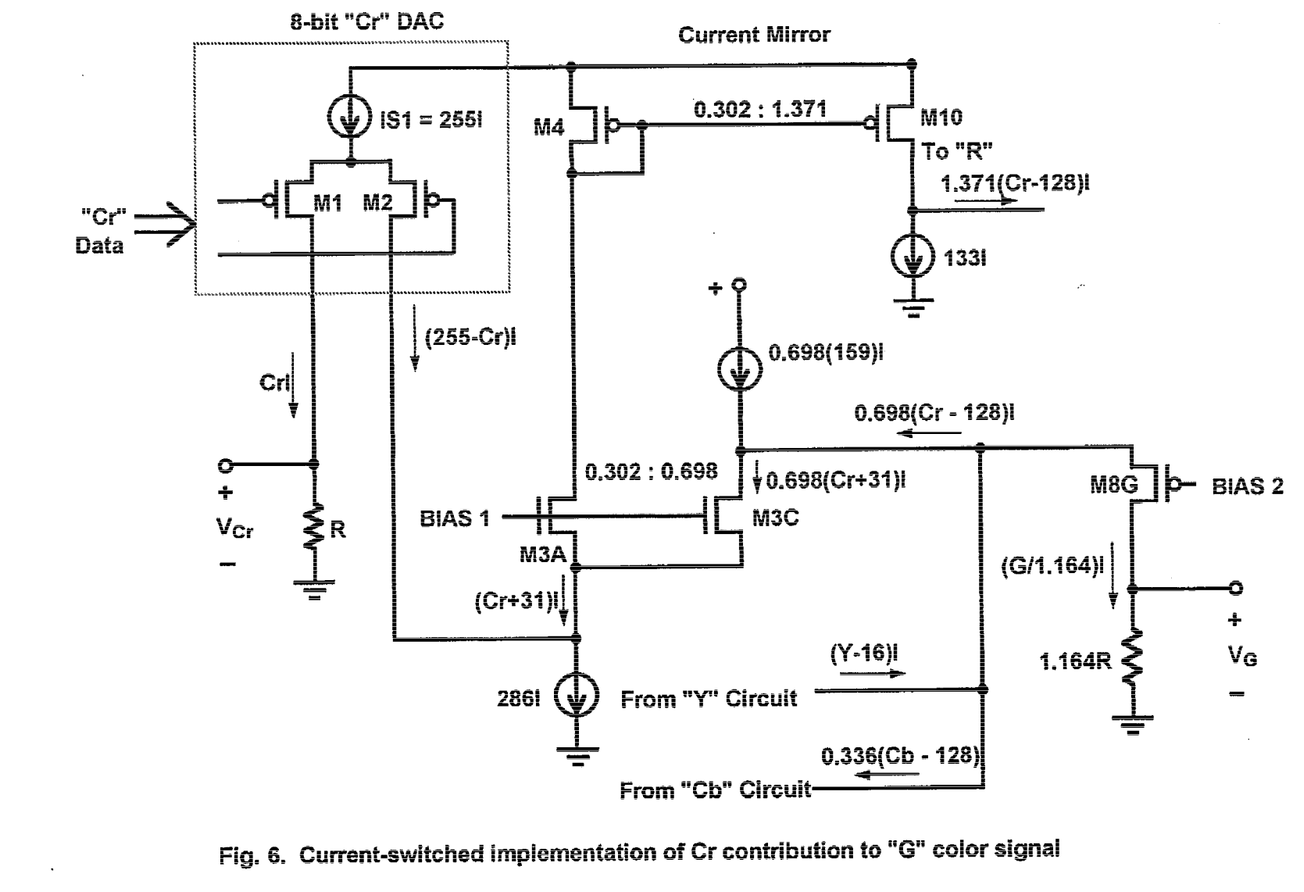
FIG. 6 is a circuit diagram of an analog, current-mode color space conversion circuit for converting $C_r$ data signals into a portion of a green (G) color signal.

Referring to FIGS. 4A, 5 and 6, there is shown a high-speed, low-cost color space converter circuit in accordance with the present invention. The circuit is based on an analog current-mode approach and does not require the use of operational amplifiers. Shown in FIG. 4A is a simplified schematic representative of a portion of a current-mode Color Space Converter. This schematic illustrates the signal path through the circuits used to generate current-mode signals derived from the digital "Y" input data and then combine one of those signals with similar signals derived from the $C_b$ and $C_r$ inputs to produce a voltage representing the "Green" (G) color. Similar circuit topologies are used to generate the signals that are derived from the $C_b$ and $C_r$ inputs and combine the appropriate current-mode signals to produce the voltage signals for the "Red" (R) and "Blue" (B) colors. FIG. 5 illustrates the signal path from the "$C_b$" input to the G output, and FIG. 6 illustrates the signal path from the "$C_r$" input to the G output.

Referring to FIG. 4A, the current source $I_{S1}$ and transistors M1 and M2 are an "equivalent" current switch that simply models an 8-bit current-mode digital-to-analog converter (DAC) controlled by the digital word that represents the level of the luminance (Y) signal. One of the DAC's complementary current outputs drives termination resistor $R_1$ to generate the analog Y signal, $V_Y$. The complementary DAC output, representing the signal value (255−Y), is fed through a folded cascode structure (M3, M4, $I_{S2}$) into a current mirror (M4, M5, M6, M7) that is used to generate the Y components of the G, R and B signals. Multiplication by a fixed coefficient (1 in the case of the Y input, 0.698 for $C_r$ and 0.336 for $C_b$) can be implemented simply by appropriately ratioing the current mirror transistors. Addition and subtraction are realized by means of current summing or steering. For example, the current (Y−16)I out of node A equals the sum of the current (Y+31)I into node A and the control current −47I. Finally, the common factor of 1.164 specified in the conversion matrix shown above can be realized by using a biased (BIAS 2) pass transistor M8G coupled to an output termination resistor, $R_2$, that is 1.164 times larger than the nominal value, R, used to generate the Y, $C_b$ and $C_r$ voltage signals from the DAC outputs.

All fractional quantities, such as 1.164, 0.336, 1.371, and so on that are mentioned in this document should be understood to be approximate values, representing relative current values that may vary slightly (typically by less than 0.5% from the values used in this document) from one implementation to another.

Figure 4B:
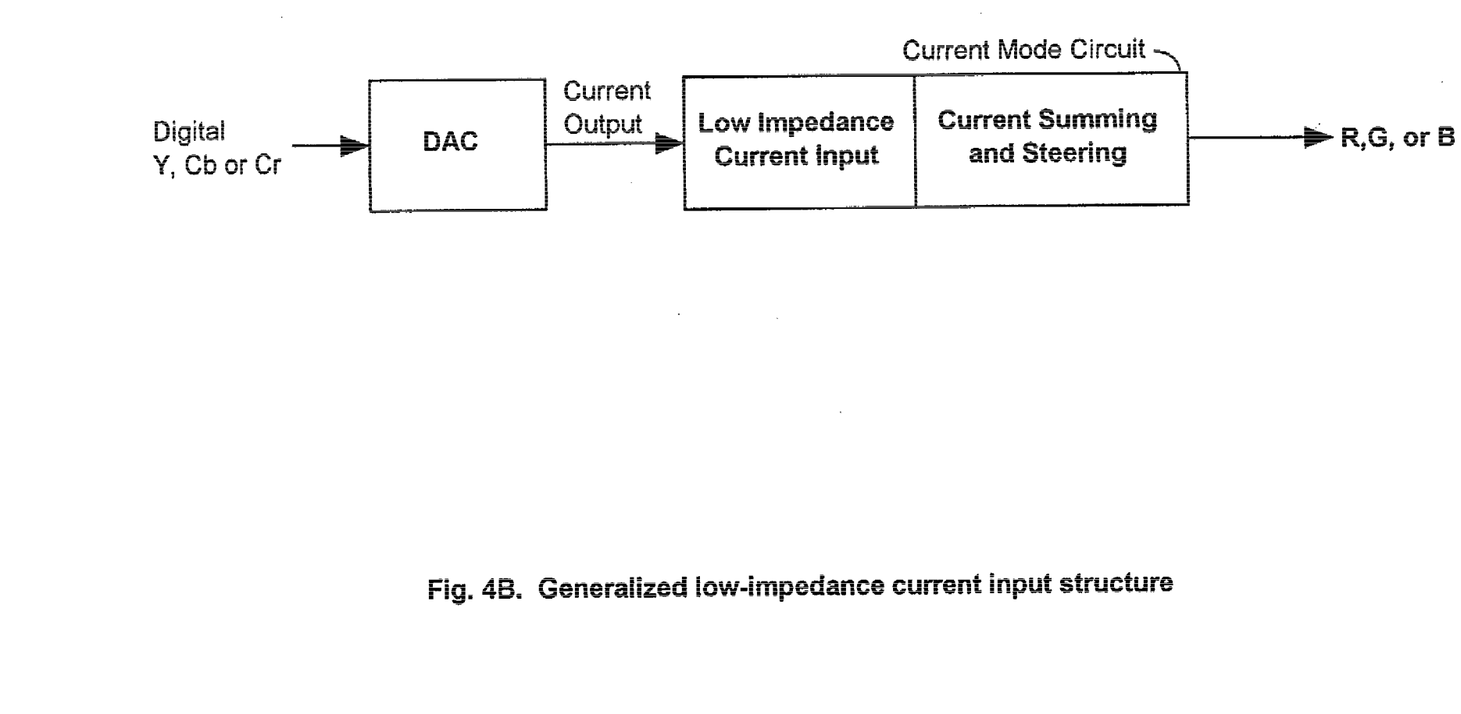
FIG. 4B is a block diagram of the current-mode color space conversion circuit of FIG. 4A (and FIGS. 5 and 6) showing a generalized low-impedance input structure corresponding to the folded cascode structures of FIG. 4A, 5 and 6.

The folded cascode structure of FIG. 4A (and also, of FIGS. 5 and 6) is one preferred embodiment of a low-impedance current input structure. As shown in FIG. 4B, the current mode circuit of the present invention can generally be thought of as a low impedance current input structure that is coupled to a current summing and steering structure (corresponding to the current mirrors and adders in FIG. 4A), which generates the R, G and B signals. The use of the low impedance current input structure contributes to the high speed current mode operation provided by the present invention. The teachings of the present invention are intended to cover any such low-impedance current input structures.

Shown in FIG. 5 is a schematic of the circuits used to derive the needed current-mode signals from the digital "$C_b$" input and then combine one of those signals with corresponding signals derived from the Y and $C_r$ inputs in order to generate the G output voltage. In this schematic the current source $I_{S1}$ and transistors M1 and M2 are an equivalent current switch that represents an 8-bit current-mode digital-to-analog converter (DAC) controlled by the digital $C_b$ signal.

Transistors M3A and M3B in FIG. 5 illustrate the use of multiple common-gate transistors for current division. As shown in the Fig., the current drawn from the common source node of M3A and M3B is ($C_b$+31)I. By appropriately ratioing the sizes of M3A and M3B, a specific fraction of that current can be obtained. That is, the input current signal is multiplied by a coefficient less than 1. In the case of FIG.

5, the current signal $(C_b+31)I$ is multiplied by 0.336. The result is then subtracted from a fixed current of $0.366(159)I=53.4I$ to obtained the required contribution of $-0.336(128-C_b)I$ for the G output.

Note that the common-gate transistors M3A and M3B have been used to obtain the required multiplication, rather than a PMOS current mirror, because the current term $0.336(C_b 128)I$ is subtracted from, rather than added to, the current that produces the G output. That is, the sign of this term in the color matrix equations, (1), is negative.

FIG. 5 also includes a current mirror (M4, M9) that is used to multiply the current drawn by the transistor M3A $(0.664(C_b+31)I)$ by the ratio 1.734 to 0.664 to generate the required "$C_b$" contribution to the B output $(1.734(C_b-128)I)$.

Shown in FIG. 6 is a schematic of the circuits used to derive the needed current-mode signals from the digital "$C_r$" input and then combine one of those signals with corresponding signals derived from the Y and $C_b$ inputs in order to generate the G output voltage. In this schematic the current source $I_{S1}$ and transistors M1 and M2 are an equivalent current switch that represents an 8-bit current-mode digital-to-analog converter (DAC) controlled by the digital $C_r$ signal.

The current drawn from the common source node of M3A and M3C is $(C_r+31)I$. By appropriately ratioing the sizes of M3A and M3C, a specific fraction of that current can be obtained. That is, the input current signal is multiplied by a coefficient less than 1. In the case of FIG. 6, the current signal $(C_r+31)I$ is multiplied by 0.698. The result is then subtracted from a fixed current of $0.698(159)I=111I$ to obtained the required contribution of $-0.698(128-C_r)I$ for the G output.

FIG. 6 also includes a current mirror (M4, M10) that is used to multiply the current drawn by the transistor M3A $(0.302(C_r+31)I)$ by the ratio 1.371 to 0.302 to generate the required "$C_r$" contribution to the R output $(1.371(C_r-128)I)$.

Figure 7A:
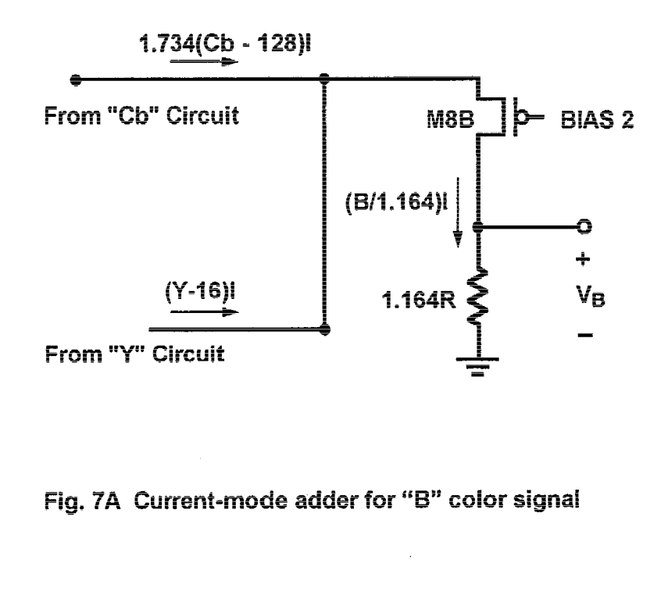
FIG. 7A is a circuit diagram of an analog, current-mode adder for combining portions of the Y and $C_b$ data signals into a blue (B) color signal.

The R and B outputs are computed from current signals provided by the circuits shown in FIGS. 4A, 5 and 6. The B output is the sum of the currents sourced from the nodes of FIGS. 4A and 5 labeled "To B". The "To B" current from FIG. 4A, $(Y-16)I$, is the Y contribution to the B output. The "To B" current from FIG. 5, $1.734(C_b-128)I$, is the $C_b$ contribution to the B output. These signals are added using the adder circuit shown in FIG. 7A, which includes a p-channel transistor M8B and an output termination resistor with resistance 1.164R. This adder performs the same function as the comparable elements M8G and $R_2$ Of FIGS. 4A, 5 and 6.

Figure 7B:
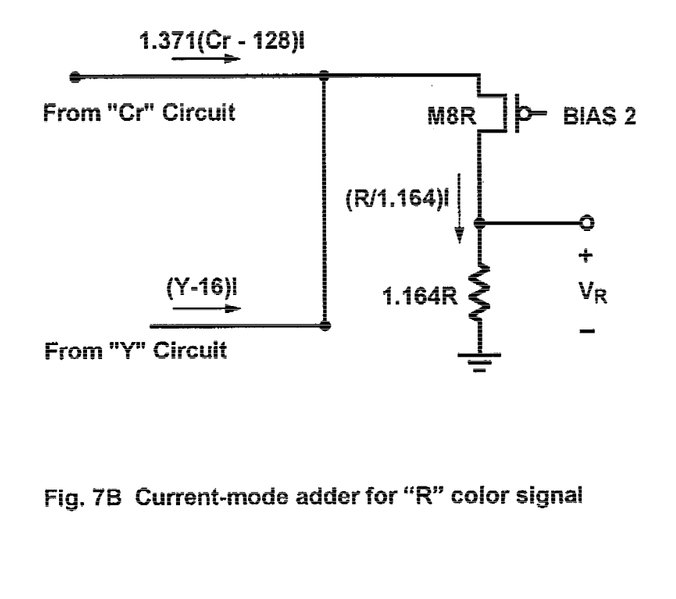
FIG. 7B is a circuit diagram of an analog, current-mode adder for combining portions of the Y and $C_r$ data signals into a red (R) color signal.

The R output is the sum of the currents sourced from the nodes of FIGS. 4A and 6 labeled "To R". The "To R" current from FIG. 4A, $(Y-16)I$, is the Y contribution to the R output. The "To R" current from FIG. 6, $1.371(C_r-128)I$, is the $C_r$ contribution to the R output. These signals are added using the adder shown in FIG. 7B, which includes a p-channel transistor M8R and an output termination resistor with resistance 1.164R. This adder performs the same function as the elements M8G and $R_2$ of FIGS. 4A, 5 and 6.

In summary, the new current-mode implementation of a Color Space Converter incorporates the following features:

open-loop design;

a differential current steering structure that allows high speed operation at the digital analog interface;

a low impedance input structure that accepts current inputs allowing high speed current mode operations;

current-mode operation employing a folded cascode topology (which implements the low-impedance input structure);

as shown in FIG. 4A, the current source, $I_{S2}$, conducts a current larger than the full scale output of the DAC to ensure a well-defined minimum current through current mirror formed by M3 and M4, which in turn ensures high-speed current switching;

multiplication by fixed coefficients is realized by device ratios in both current mirrors and cascode transistors with a common input;

subtraction and addition are realized by current steering and summing; and a common multiplication factor is realized by using an output termination resistor of the appropriate value.

As a result of this design, the preferred embodiment of the Current-Mode Color Space Converter provides the following advantages:

current-mode operation;

no operational amplifiers, which, if they were used, would limit the maximum clock rate;

an open-loop design (i.e., a design without feedback), which also enables high-speed operation;

$YC_bC_r$ and RGB outputs which are available simultaneously (at termination resistors such as $R_1$ and $R_2$, respectively, in FIG. 4A); and simple circuits, which facilitate high operating frequencies and small chip area.

While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

Additionally, note that the teachings of the present invention are equally applicable to the conversion of RGB signals to $YC_bC_r$, YIQ or many other color space formats, the present detailed description of a $YC_bC_r$ to RGB color space converter set out in the Figures merely being an illustration of a preferred application of the techniques embodied in the present invention. Such alternate uses are accomplished by modifying the current ratios in the described circuits to implement the matrices of equations that respectively describe the conversions between RGB and the other color spaces. These equations are well known and can also be found in the CCIR specification. Similarly, the present invention can be easily modified to allow conversion of YUV signals or signals in formats that are variants of the $YC_bC_r$ color space to the RGB signals.

What is claimed is:

1. A current-mode color space converter to convert Y, $C_b$ and $C_r$ signals to G, R and B signals, comprising:

Y, $C_b$ and $C_r$ current-mode conversion circuits to compute Y, $C_b$ and $C_r$ contributions to the G, R and B signals, each conversion circuit including (A) a respective low-impedance current-input structure having an input coupled to a respective analog Y, $C_b$ or $C_r$ signal, each conversion circuit generating a respective Y, $C_b$ or $C_r$ current output; (B) at least one respective current mirror that generates from the Y, $C_b$ or $C_r$ current output an unadjusted Y, $C_b$ or $C_r$ contribution to at least one of the G, R and B signals, and (C) at least one current adder for subtracting respective offset currents from said unadjusted Y, $C_b$ or $C_r$ contribution to said at least one of said G, R and B signals to provide the Y, $C_b$ or $C_r$ contribution to at least one of the G, R and B signals; and a plurality of current-mode adders that respectively add said contributions to the G, R and B signals to generate the G, R and B signals.

2. The color space converter of claim 1, wherein said low impedance current-input structure comprises a folded-cascode structure.

3. The color space converter of claim 1, further comprising: a digital to analog converter for converting digitized $YC_bC_r$ signals to the analog $YC_bC_r$ current signals.

4. The color space converter of claim 3, wherein said digital to analog converter comprises a current output digital to analog converter to enable high-speed current mode operations.

5. The color space converter of claim 3, at least one of the Y, $C_b$ or $C_r$ current-mode conversion circuits including a respective current divider providing first and second divided currents representing specific respective factions of the respective Y, $C_b$ or $C_r$ current output wherein at least one of the first and second divided currents comprises an additional unadjusted Y, $C_b$ or $C_r$ contribution to said at least one of said G, R and B signals, and a respective additional current adder for subtracting respective offset currents from said additional unadjusted Y, $C_b$ or $C_r$ contribution to said at least one of said G, R and B signals to provide the Y, $C_b$ or $C_r$ contribution to at least one of the G, R and B signals.

6. The color space converter of claim 1, said Y, $C_b$ and $C_r$ current-mode conversion circuits and said plurality of current-mode adders together generate said G, R and B signals from said Y, $C_b$ and $C_r$ signals in accordance with:

$$R = 1.164(Y - 16) + 1.596(C_r - 128)$$
$$G = 1.164(Y - 16) - 0.813(C_r - 128) - 0.391(C_b - 128)$$
$$B = 1.164(Y - 16) + 2.018(C_b - 128).$$

7. The color space converter of claim 1, wherein said color space converter is implemented as an integrated circuit.

8. The color space converter of claim 7, wherein said color space converter can convert the $YC_bC_r$ signals to the RGB signals at pixel rates of at least 80 MHz.

9. A current-mode color space converter to convert Y, $C_b$ and $C_r$ signals to G, R and B signals, comprising:

a Y conversion circuit to compute Y contributions to the G, R and B signals, the Y conversion circuit including:
a first folded cascode structure having an input coupled to an analog Y signal and a Y current output; and
a first current mirror that generates from the Y current output the Y contributions to the G, R and B signals;

a $C_b$ conversion circuit to compute $C_b$ contributions to the G and B signals, the $C_b$ conversion circuit including:
a second folded cascode structure having an input coupled to an analog $C_b$ signal and a $C_b$ current output;
a first current divider providing first and second divided $C_b$ currents representing specific respective fractions of the $C_b$ current output;
a second current mirror that generates from the first divided $C_b$ current the $C_b$ contribution to the B signal; and
a first current adder that subtracts from the second divided $C_b$ current a first difference current to provide the $C_b$ contribution to the G signal; and a $C_r$ conversion circuit to compute $C_r$ contributions to the G and R signals, the $C_r$ conversion circuit including:
a third folded cascode structure having an input coupled to an analog $C_r$ signal and a $C_r$ current output;

a second current divider providing first and second divided $C_r$ currents representing specific respective fractions of the $C_r$ current output;
a third current mirror that generates from the first divided $C_r$ current the $C_r$ contribution to the R signal; and
a second current adder that subtracts from the second divided $C_r$ current a second difference current to provide the $C_r$ contribution to the G signal.

10. The color space converter of claim 9, further comprising:

a digital to analog converter for converting digitized $YC_bC_r$ signals to the analog $YC_bC_r$ signals; and a plurality of current-mode adders that respectively add the contributions to the G, R and B signals to generate the G, R and B signals.

11. The color space converter of claim 10, wherein:

the Y, $C_b$ and $C_r$ current outputs are $(Y+31)I$, $(C_b+31)I$ and $(C_r+31)I$, respectively;

the Y contribution to the G, R and B signals is approximately $(Y-16)I$;

the $C_b$ contribution to the B signal is approximately $1.734(C_b-128)I$;

the $C_b$ contribution to the G signal is approximately $-0.336(C_b 128)I$;

the $C_r$ contribution to the G signal is approximately $-0.698(C_r-128)I$;

the $C_r$ contribution to the R signal is approximately $1.371(C_r-128)$; and the current mode adders are configured to add the contributions and then multiply each respective current sum by approximately 1.164.

12. The color space converter of claim 9, further comprising a plurality of current-mode adders that respectively add the contributions to the G, R and B signals to generate the G, R and B signals, wherein said Y, $C_b$ and $C_r$ conversion circuits and said plurality of current-mode adders together generate said G, R and B signals from said Y, $C_b$ and $C_r$ signals in accordance with:

$$R = 1.164(Y - 16) + 1.596(C_r - 128)$$
$$G = 1.164(Y - 16) - 0.813(C_r - 128) - 0.391(C_b - 128)$$
$$B = 1.164(Y - 16) + 2.018(C_b - 128).$$

13. The color space converter of claim 9, wherein said color space converter is implemented as an integrated circuit.

14. The color space converter of claim 13, wherein said color space converter can convert the $YC_bC_r$ signals to the RGB signals at pixel rates of at least 80 MHz.

15. The color space converter of claim 9, wherein the folded cascode structures are terminated by a current source set to draw a current of a controlled value that is larger than predefined full-scale current values of the analog $YC_bC_r$ signals, thereby ensuring non-zero current in the cascode structures and allowing high-speed current-mode operations.

16. A current-mode color space converter to convert first color space signals to second color space signals, comprising:

first color space current-mode conversion circuits to compute first color space contributions to the second color space signals, each conversion circuit including (A) a respective low-impedance current-input structure having an input coupled to a respective analog first color space signal, each conversion circuit generating a respective first color space current output; (B) at least one respective current mirror that generates from the first color space current output an unadjusted first color space contribution to at least one of the second color space signals, and (C) at least one current adder for subtracting respective offset currents from said unadjusted first color space contribution to said at least one of said second color space signals to provide the first color space contribution to at least one of the second color space signals; and a plurality of current-mode adders that respectively add said contributions to the second color space signals to generate the second color space signals.

17. The color space converter of claim 16, wherein said low impedance current-input structure comprises a folded-cascode structure.

18. The color space converter of claim 16, further comprising:

a digital to analog converter for converting digitized first color space signals to the analog first color space signals.

19. The color space converter of claim 18, wherein said digital to analog converter comprises a current output digital to analog converter to enable high-speed current mode operations.

20. The color space converter of claim 18, at least one of the first color space current-mode conversion circuits including a respective current divider providing first and second divided currents representing specific respective factions of the respective first color space current output wherein at least one of the first and second divided currents comprises an additional unadjusted first color space contribution to said at least one of said second color space signals, and a respective additional current adder for subtracting respective offset currents from said additional unadjusted first color space contribution to said at least one of said second color space signals to provide the first color space contribution to at least one of the space signals.

* * * * *